United States Patent [19]
Thomison

[11] 3,911,806
[45] Oct. 14, 1975

[54] EGG HOLDER

[76] Inventor: Everett C. Thomison, 5426 Virginia Ave. Box 109, Los Angeles, Calif. 90029

[22] Filed: Nov. 29, 1974

[21] Appl. No.: 528,090

[52] U.S. Cl. .................... 99/411; 99/415; 99/418; 99/440; 99/448
[51] Int. Cl.² ........................................ A47J 29/06
[58] Field of Search ............ 99/440, 448, 416, 411, 99/403, 415, 418

[56] References Cited
UNITED STATES PATENTS

| | | | |
|---|---|---|---|
| 1,193,523 | 8/1916 | Deming | 99/418 |
| 2,040,648 | 5/1936 | Fortes | 99/440 |
| 2,040,649 | 5/1936 | Fortes | 99/440 |

FOREIGN PATENTS OR APPLICATIONS

| | | | |
|---|---|---|---|
| 482,260 | 3/1917 | France | 99/415 |
| 605,944 | 11/1934 | Germany | 99/440 |
| 606,243 | 8/1948 | United Kingdom | 99/440 |

Primary Examiner—Billy J. Wilhite
Attorney, Agent, or Firm—Marden S. Gordon

[57] ABSTRACT

An egg holder for boiling a plurality of eggs suspended in water in a cooking pan and consisting of a hollow cylindrical core having a top and bottom disc shaped member affixed concentric therewith at opposite ends thereof, a series of tubes spaced circumferally apart from each other and extending parallel to the core and opening out of openings provided in the top disc member, a handle threadedly received in the top end of the core, and a plurality of independent separate wire formed baskets shaped to hold a single egg therein and suspended from the tubes with there being a washer member slidably affixed to the handle stem for removably retaining the baskets in the tubes.

6 Claims, 3 Drawing Figures

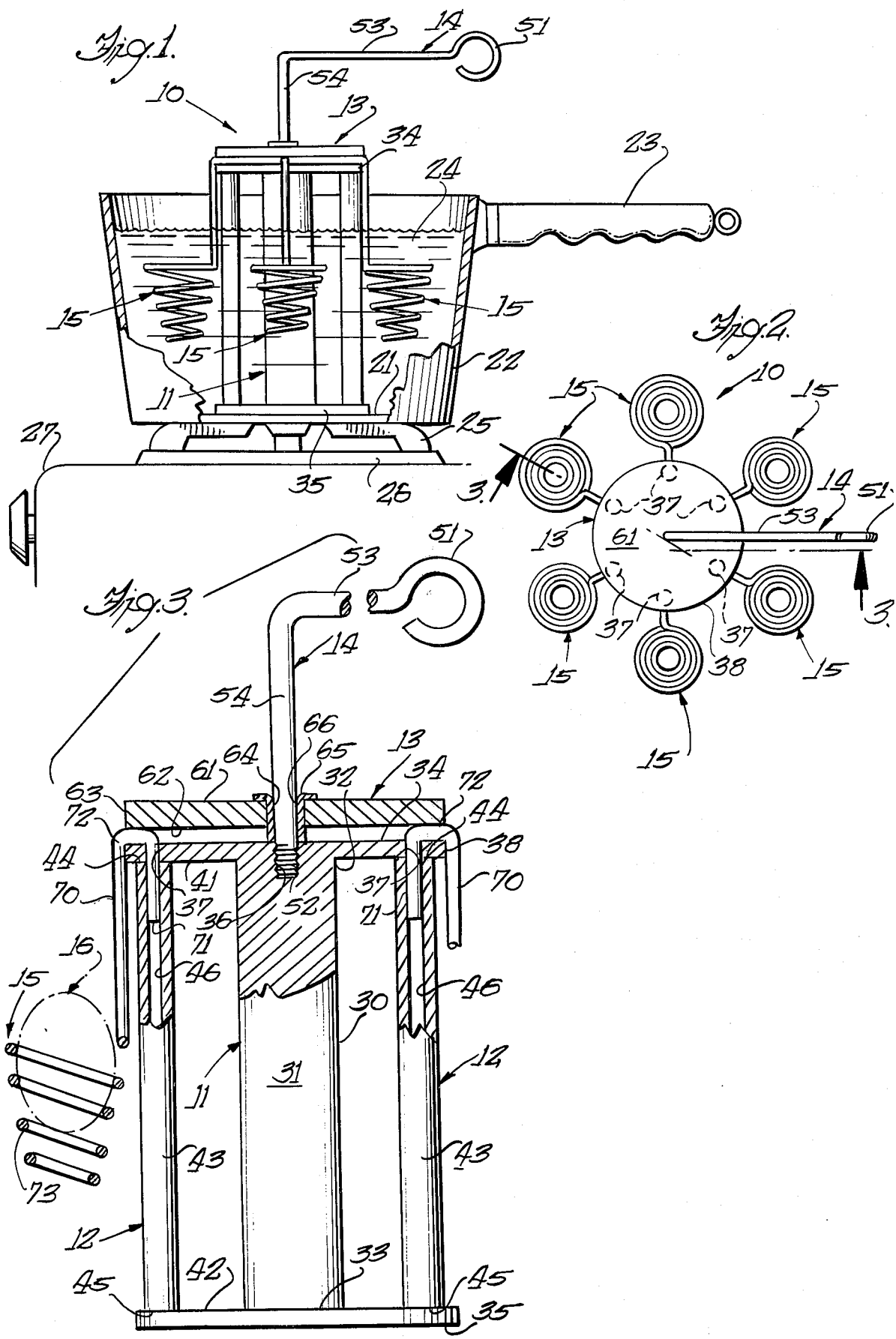

EGG HOLDER

BACKGROUND OF THE INVENTION

1. Field of the Invention

This invention relates generally to cooking apparatus and more particularly to a novel egg holder for the boiling of a plurality of eggs.

2. Description of the Prior Art

The popularity of hard and soft boiled eggs among individuals of all ages is well known, and in view thereof there have been developed electrically operated and pressure operated egg boiling devices and the like for use in the household to provide boiled eggs. However, such devices are complex to manufacture and thus expensive to purchase, and are difficult to clean and maintain in a proper state of repair.

In view of the cost of such devices, housewives and other household members presently boil eggs by merely placing the eggs loosely in a pan full of water placed on the burner of a stove, this causing cracking and breakage of the eggs as the boiling water causes the eggs to bang against each other, this being undesirable and effecting the end result as to the quality of boiled eggs achieved in this manner.

SUMMARY OF THE INVENTION

The present invention provides a novel egg holder for boiling eggs in a conventional household pan on a conventional burner and in water contained in the pan in a manner retaining the eggs separately suspended in the water apart from each other to prevent any damage of the eggs by striking each other, the device being readily removed from the pan and readily inserted into the pan of water for boiling the eggs.

It is a feature of the present invention to provide an egg holder for boiling eggs.

A further feature of the present invention provides an egg holder for boiling eggs which is relatively simple in its construction and which therefore may be readily manufactured at a relatively low cost and by simple manufacturing methods so that it can be retailed at a sufficiently low price to encourage widespread use thereof among the general public.

Still a further feature of the present invention provides an egg holder for boiling eggs which is easy to use and which is reliable and efficient in operation.

Yet still a further feature of the present invention provides an egg holder for boiling eggs which is of a rugged and durable construction easily disassembled for thorough cleaning and which may be guaranteed by the manufacturer to withstand many years of intended usage.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a side elevational view of the egg holder of the invention illustrated positioned in a pan full of water;

FIG. 2 is a top plan view of the egg holder of the invention; and

FIG. 3 is a fragmentary cross-sectional view taken along lines 3—3 of FIG. 2.

DESCRIPTION OF THE PREFERRED EMBODIMENT

Referring now to the drawings in detail there is illustrated a preferred form of an egg holder for boiling eggs which is constructed in accordance with the principles of the present invention and which is designated generally in its entirety by the reference numeral 10 and which is comprised of a base core member 11, a plurality of vertical tubes 12, a washer member 13, a handle 14, and a series of identically shaped and configured independent egg holding baskets 15 each adapted to hold therein an egg 16.

For purposes of illustration the egg holder 10 is illustrated resting on the interior bottom surface 21 of a conventional household pan 22 having handle 23 and which is filled with water 24, the pan resting atop the grate 25 of burner 26 on stove 27.

The base 11 consists of a central cylindrically shaped core member having cylindrical side walls 31, a top end 32, and a bottom end 33. Secured to top and bottom ends 32 and 33 respectively are top and bottom flat disc shaped members 34 and 35 each affixed concentric with the core member 30 extending radially outwardly therefrom to define therewith a reel like configuration. An interiorly threaded cylindrical recess 36 provided axially of the top end 32 of core 30. A total of six circumferally spaced apart circular openings 37 are equally spaced about the periphery of top disc member 34 inwardly of the peripheral edge 38.

Each of the tube members 12 are of an identical configuration and are disposed parallel to core member 30 and extend completely between the confronting interior surfaces 41 and 42 of top and bottom end disc members 34 and 35 respectively, each of the tube members being of a hollow open ended configuration having cylindrical side walls 43, top end 44, bottom end 45, and a cylindrical passageway 46 extending axially therethrough. The passageways 46 are axially aligned with associated ones of the openings 37 with the top and bottom ends 44 and 45 being secured to the top and bottom members 34 and 35 respectively.

The handle 14 is of an elongated unitary rod bent into an L-shaped configuration and having an eye 51 formed at one end thereof with the opposite end extending vertically downwardly relative to the portion on which the eye is formed and terminating in a threaded end 52 adapted to be threadedly received in threaded recess 36. The eye 51 is affixed to the handle portion 53 of the L-shaped handle, with the threaded end 52 being at the end of the stem portion 54 of the handle. The handle portion 53 extends horizontally radially outwardly relative to the core member 30 a distance greater than the radius of the top member 34, such as seen in FIG. 1.

The washer member 13 is of a flat circular configuration having a top surface 61, a flat bottom surface 62, peripheral side edges 63, a central aperture 64 extending axially therethrough, and a bushing 65 retained in the central aperture and extending therethrough and having an interior diameter 66 to be snugly received on handle stem 54 intermediate threaded end 52 and handle member 53. The diameter of washer member 13 is substantially equal to the diameter of top member 34 such that bottom surface 62 overlaps all of the openings 37. The washer member 13 is slidable reciprocally along stem 54 between a position adjacent top member 34 and a position adjacent handle member 53.

Each of the baskets 15 is formed by taking a length of wire 70 and bending one end 71 down onto itself to form a top hook portion 72 of an inverted U-shaped configuration, the opposite end being coiled spirally with coils of constantly decreasing diameter resulting in an inverted generally conical configuration having the largest diameter spaced vertically upwardly from the minimum diameter, such end 73 being of a size and configuration defining the basket adapted to hold the egg 16 supportingly therein. Each of the basket ends 73 are spaced vertically downwardly from the hook portions 72, with the hook portion being of a size and configuration such that end 71 is removably received through any of the openings 37 and into the associated tubular passageways 46 for removably retaining the basket 15 to the core base 11.

When inserting the hook portion 72 into the openings 37, washer 13 is moved into a position adjacent handle portion 53, and after the hooks have been so inserted, washer 13 is moved downwardly along stem 54 until its bottom surface 62 engages the exterior bight portion of the hook 72 to retain the baskets 15 in position thereon.

The handle 14 is adapted to be gripped for extending the core 11 and baskets 15 when filled with eggs 16 simultaneously into the water 24 of pan 22 for the hard or soft boiling of the eggs, with the handle being used to remove the core and baskets from the water after the eggs have been boiled to the desired extent.

It is to be understood that utilization of the egg holder of the present invention minimizes the breakage of eggs during the boiling thereof as well as minimizes the possibility of damage or breakage to the eggs when lifting eggs out of the pan as well as when inserting the eggs into the pan for boiling therein.

Further, it is to be understood that the handle 14 is readily unthreaded from core 11 to remove washer member 13 such that the egg holder 10 is readily disassembled for ease of cleaning purposes, while being readily reassembled preparatory for use in a manner requiring no special skills or expertise or tools in such assembly or disassembly operation.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. An egg holder for boiling eggs in a pan full of water, the egg holder comprising, in combination:
   a base forming core member;
   a plurality of supporting tubes affixed to said base member; said base member having a portion thereof extending above the upper ends of said tubes,
   a handle member removably affixed to said base member portion;
   a washer member slidable along a portion of said handle member between a position adjacent said base member portion and a position spaced from said base member portion; and
   a plurality of separate egg holding baskets each having a support arm and each said arm adapted to be mounted at spaced locations about said base member portion and extend outwardly and downwardly therefrom to support an egg therein for cooking, said washer member being adapted to overlie said arms and said base member portion to retain the baskets on said base member portion.

2. The egg holder as set forth in claim 1 wherein said base member portion is further characterized by:
   a central core member of a vertically disposed cylindrically shaped member having cylindrical side walls, a top end, and a bottom end;
   a flat disc shaped top member affixed concentric to said core top end and extending radially outwardly relative thereto;
   a flat disc shaped bottom member affixed concentrically to said core bottom end and extending radially outwardly relative thereto;
   said top member having a flat top surface, a flat bottom surface, and cylindrical side walls;
   said bottom member having a flat top surface, a flat bottom surface, and cylindrical side walls;
   a series of circumferally spaced apart circular openings disposed in said top member inwardly of said edge thereof and extending therethrough, the openings being equally spaced apart from each other.

3. The egg holder as set forth in claim 2 wherein said tubes are further characterized by:
   each tube being of an identical configuration to each other tube, each tube having cylindrical side walls, a top end, and a bottom end;
   a cylindrical passageway extending axially through each of said tubes and opening out of the top end thereof;
   each tube positioned intermediate said top and bottom members with its passageway axially aligned vertically with an associated one of said top member openings, the top end of each tube engaging the bottom surface of said top member with the bottom end of each tube engaging said top surface of said bottom member.

4. The egg holder as set forth in claim 3 wherein said handle member is further characterized by being formed of a single unitary length of wire bent into an L-shaped configuration defining a handle portion and a stem portion, said handle portion extending horizontally with said stem portion extending vertically, the end of said handle portion being bent into an eye type configuration; the end of said stem portion being threaded and adapted to be threadedly received in said threaded recess in said core member.

5. The egg holder as set forth in claim 4 wherein said washer member is further characterized by:
   a flat top surface;
   a flat bottom surface;
   a diameter at least equal to the diameter of said top member with said washer bottom surfaces overlying said openings in said top member;
   a central aperture of a diameter greater than the diameter of said handle stem portion;
   a bushing received in said central aperture;

a passageway extending axially through said bushing of a diameter to snugly receive said stem portion of said handle therethrough to permit selective movement of said washer member between a position adjacent said top member and a position spaced away from said top member.

6. The egg holder as set forth in claim 5 wherein each of said baskets is of an identical configuration and is further characterized by:

a single length of wire stock material having a top end and a bottom end;

said top end portion being bent over and back onto itself to define an inverted U-shaped hook member adapted to have its free end inserted through one of the top member openings and received in the associated tube passageway;

the opposite end portion of said wire being bent into an inverted generally conical configuration of a size to restingly receive an egg therein.

* * * * *